Jan. 29, 1963 H. B. HORTON 3,075,548

DELAY LINE MEMORY

Filed Sept. 26, 1960

INVENTOR
H. BURKE HORTON
BY B. F. Griffin Jr.
ATTORNEY

United States Patent Office 3,075,548
Patented Jan. 29, 1963

3,075,548
DELAY LINE MEMORY

Harold Burke Horton, Norwalk, Conn., assignor to Sperry Rand Corporation, New York, N.Y., a corporation of Delaware Filed Sept. 26, 1960, Ser. No. 58,467
16 Claims. (Cl. 137—569)

The present invention relates to information storage devices of the type commonly referred to as delay line memories. More particularly, the present invention provides a fluid delay line memory wherein the read, write, and recirculate functions are all performed in response to fluid control signals.

As is well known to those skilled in the art, data processing devices usually include some means for remembering or storing information. In electromechanical data processing devices the data may be represented by a series of relays which are energized in a given pattern. In electronic data processing devices the data may be represented in any one of several ways including a series of electronic flip-flop circuits, a series of magnetic core elements, or a series of magnetized areas on the periphery of a continuously rotating magnetic drum.

With the advent of the fluid amplifier there has been introduced into the art a new family of data processing devices which are fluid operated. Since the principles involved in the fluid amplifier are readily adaptable to digital techniques, data processing devices have been developed wherein the processing functions are carried out by logical circuits which operate in conformance with fluid principles. Heretofore the storage or memory function of fluid operated data processing devices has been performed by fluid flip-flops. This method of storing information has a distinct disadvantage in that requires at least one fluid flip-flop for each bit of information which is to be stored. The use of a separate fluid flip-flop for storing each bit of information results in increased size of the data processing device and at the same time increases its cost.

Therefore, an object of the present invention is to provide a memory device for a data processor of the fluid type, said memory device requiring fewer elements than heretofore.

More particularly, an object of the present invention is to provide a memory device for a data processor of the fluid type, said memory device comprising a fluid delay line. The input of the delay line is connected to the output of a fluid amplifier for the purpose of introducing data pulses into the delay line. The end of the delay line returns to and is connected as one input to the fluid amplifier to provide a closed path for recirculating pulses. A second fluid amplifier is connected to a tap on the delay line for the purpose of amplifying signals before they are read out to other portions of the data processing device.

As is well known in the art, memory devices frequently serve as serial to parallel converters. That is, the memory device receives data in the form of pulses occurring one after another in time and, after receipt of all the data pulses, produces a group of pulses on parallel output lines, the output pulses all occurring substantially simultaneously. Although such devices are known in the prior art, they have heretofore utilized electronic or electromechanical components.

Therefore, a further object of the present invention is to provide a serial to parallel converter which utilizes only fluid components. In this embodiment the fluid delay line is tapped at given intervals and the tapped signals applied to fluid amplifiers for the purpose of producing simultaneously a group of output signals which correspond to the signals recirculating in the delay line.

Another object of the invention is to provide a readout means for a signal storage device, said readout means comprising a fluid amplifier connected to said storage device.

Further objects will become apparent upon reading the following specification together with the accompanying drawings in which.

Figure 1:
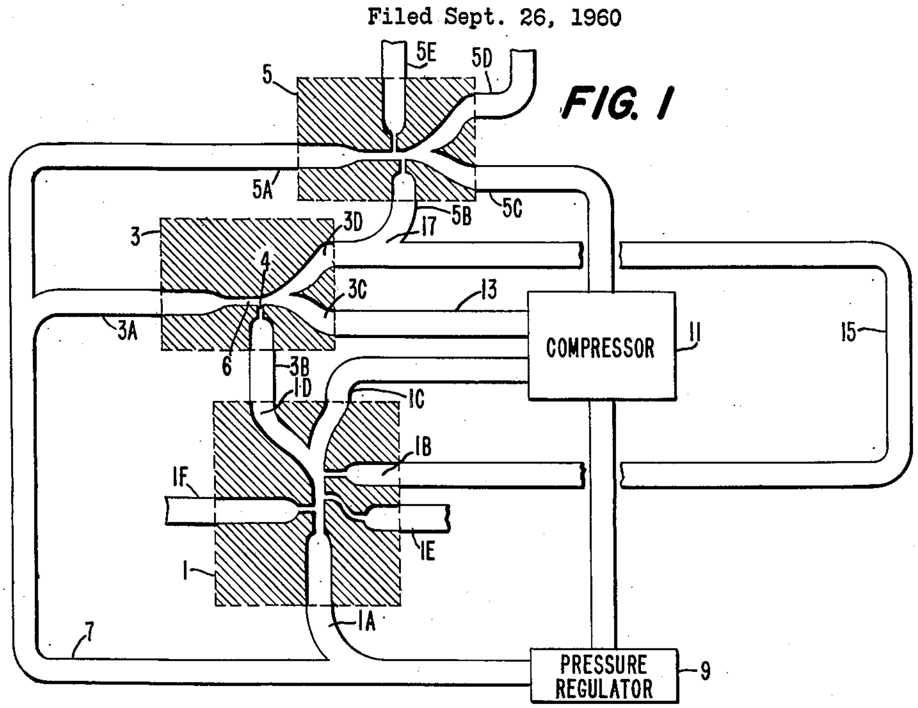
FIGURE 1 shows a first embodiment of the present invention adapted to receive serial input signals.

Referring to FIGURE 1, the amplifiers 1, 3 and 5 may be any one of the several types of fluid amplifiers known in the art. These amplifiers usually comprise one or more laminations stamped or formed from plates of metal, plastic or other suitable material. The stamped laminations are then stacked and covered on both the top and the bottom with solid plates with the stamped laminations forming a plurality of ducts such as those shown. The ends of the ducts are then threaded or otherwise adapted to be connected to pipes or other fluid conducting means.

Amplifier 3 has a power jet input 3A, a control signal input 3B, a fluid return duct 3C, and a signal output duct 3D. The power jet input is connected by means of fluid duct 7 and pressure regulator 9 to the output of a compressor 11. The arrangement of the ducts within the body 3 is such that the power stream which is continually applied to the duct 3A normally flows out the return duct 3C and is returned to the compressor 11 by way of the conduit 13. If a fluid control signal is applied to input 3B, this signal will appear as a jet stream issuing from the orifice 4. This jet stream, henceforth called the control jet, will strike the power jet issuing from the orifice 6 and deflect the power jet into output duct 3D causing a distinguishable output signal in the form of increased fluid pressure.

The amplifier 5 is similar to amplifier 3 and has a power jet input 5A, a control signal input 5B, a fluid return duct 5C, and an output duct 5D. As explained above, fluid entering the duct 5A is normally directed out of the amplifier through the duct 5C but is deflected to the output duct 5D if a control signal is applied to the control signal input 5B. The amplifier 5 has a further control jet input 5E which is not present in amplifier 3. An input signal applied to the control jet 5E overrides any control signal applied to 5B, thus causing the power stream to be deflected to the fluid return duct 5C irrespective of the presence or absence of a signal at 5B.

Fluid amplifier 1 operates in a manner similar to that of amplifiers 3 and 5. The power stream applied at duct 1A is normally directed out through the fluid return duct 1C and returned to the compressor. A control signal applied to input 1B will deflect the power stream to the output signal duct 1D. Control signal input ducts 1E and 1F are both capable of producing overriding signals. That is, a signal applied at 1E will deflect the power stream to output 1D and a signal applied to 1F will deflect the power stream to the return duct 1C irrespective of the presence or absence of a control signal at 1B. It should be noted that in normal operation signals may be applied to either 1E, or 1F, or neither, but should never be applied to both 1E and 1F simultaneously.

In summary, each of the fluid amplifiers 1, 3 and 5 continuously receives a pressure regulated stream of fluid from the compressor 11. In the absence of control signals, the fluid streams are directed to the return ducts C from whence they return to the compressor.

Information is written into the memory by means of signal inputs 1E and 1F. A signal representing a binary 1 is written by applying a control signal to 1E. This directs the power stream to the signal output D. A binary 0 is written by applying a control signal to 1F. This insures that the power stream will remain directed at the fluid return duct even though binary 1 signals are applied to input 1B. With this arrangement, information may be written into the memory and previously stored information cleared out, all on the same cycle. It is obvious that by writing binary zeros for one complete cycle, a complete word may be cleared from storage without inserting a new data word.

The signal output of amplifier 1 is connected to the control input of amplifier 3. Amplifier 3 serves to amplify the output of amplifier 1 before it is applied to the delay line and thus insures that the signals appearing at control inputs 5B and 1B will be of sufficient strength to properly deflect the power streams of amplifiers 1 and 5.

For purposes of illustration it will be assumed that the delay line of FIGURE 1 is required to store data words containing four binary bits of information. Each cycle is divided into five equal time periods, one for each of the binary bit intervals and one bit interval which is set aside to allow switching operations to take place in other portions of the data processing device external to the memory delay line. A cycle may be defined as the time required for a signal applied to an amplifier 1 to pass through amplifier 3, traverse the delay line 15, and return to amplier 1. As shown in the timing diagram of FIGURE 3, each data word cycle is divided into five equal bit times T0 through T4. The timing diagram is drawn to show four typical cycles of operation identified as write (read in), recirculate, read out, and clear. It is to be understood that the different cycles do not have to occur in the order shown in FIGURE 3. For example, there may be one or several consecutive recirculate cycles or, by proper control of signals applied to the input 5E read out may occur during the same cycle that recirculation takes place.

Figure 3:
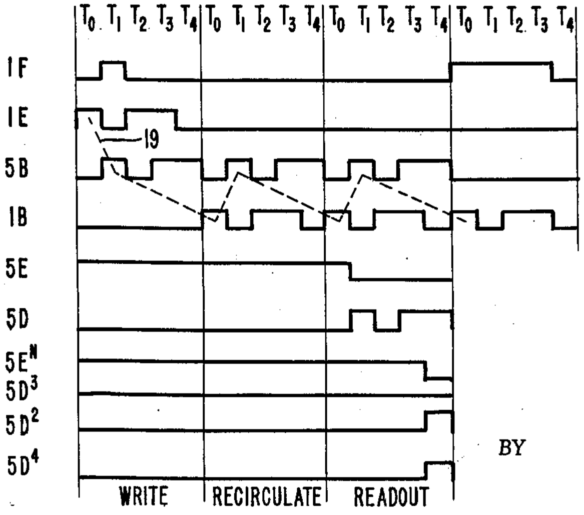

The timing diagram of FIGURE 3 is drawn to illustrate four cycles of operation upon the decimal value 13. This value is expressed in binary notation as 1101. In the embodiment shown, binary 0's are represented by a given pressure level and binary 1's are represented by a second pressure level, within the recirculation loop of the delay line. However, to write information into the memory, both 0's and 1's must be represented by signals of the second level for the reason explained above.

To write or store the binary value 1101 with the lowest denominational unit or bit being stored first the procedure is as follows. During time T0 increased pressure is applied to the control input 1E of the amplifier 1. In the manner explained above, this deflects the power stream of the amplifier to the output duct 1D causing an increase in pressure at this output. The signal from 1D is then applied to the control input 3B of the amplifier 3 to deflect this power stream to the output 3D. The increased pressure at this output is then applied to the delay line 15. This signal travels down the delay line and at time T1 reaches the tap 17 which connects with the control input amplifier 5. The tapped signal is applied to the control input 5B of the amplifier 5 but produces no deflection of the power stream for a reason to be made clear later. The course of this signal is traced by the dotted line 19 of FIGURE 3.

During bit interval T1 a control signal is applied to input 1F of the amplifier 1 and the power stream flows through the duct 1C. The signal at output 1D is relatively low thus indicating binary zero. Since the output 1D is low the power stream of amplier 3 switches back to its fluid return duct causing the pressure in output duct 3D to return to a relatively low value. Hence, binary zero is entered into the delay line as a pressure signal of relatively low value and this signal appears at tap 17 at time T2.

In the meantime, the signal present at tap 17 during time T1 has proceeded down the delay line 15 by an amount equal to one-fourth the distance between the tap 17 and the input duct 1B. During time intervals T2 and T3 binary one signals in the form of increased fluid pressures are again applied to input 1E of amplifier 1 and after a delay of one bit interval they appear during times T3 and T4 as signals at the tap 17. As shown in FIGURE 3, the signals representing the binary value 1101 are completely stored within the delay line 15 at the end of the time interval T4.

Bit interval T0 of the second cycle begins immediately following T4 of the first cycle. The first binary 1 value entered into the delay line during cycle one has traversed the length of the delay line and appears at the input 1B of amplifier 1 during this time interval. This signal deflects the power stream to the output 1D, causing the power stream of amplifier 3 to be deflected to output 3D to again enter the binary 1 value into the delay line. It is seen therefore that this signal will traverse the delay line, pass through the amplifiers 1 and 3 and return to the tap 17 at the time T1 of each cycle.

During interval T1 of the second cycle the signal representing binary zero (the one which was applied to input 1F at T1 of the first cycle) reaches the end of the delay line and is applied to the control input 1B. Since the binary zero is represented by a relatively low pressure signal, the power stream of amplifier 1 switches back to the return duct 1C. This of course removes the control signal applied to amplifier 3 permitting the power stream of this amplifier to switch back to its return duct 3C. The pressure in the duct 3D drops and a signal representing the binary zero is again entered into the delay line. It is seen therefore that the binary zero circulates through the delay line and the amplifiers and appears as a signal of relatively low fluid pressure at the tap 17 during the time T2 of each cycle. It should be obvious to one skilled in the art that the binary 1 signals present at tap 17 during T3 and T4 of the first cycle will have traversed the delay line and appear at the control input 1B during times T2 and T3 of this second cycle. These signals control the amplifiers 1 and 3 and after a delay of one time period appear at the tap 17 during the time T3 and T4 of the second cycle.

Thus far no mention has been made of the read out operation. Of course it is possible to amplify the signals appearing on the tap 17 and continuously apply them to other circuits of the data processor but in most instances it is preferred to control the read out of such signals. An inhibit read signal applied to the control input 5E of the amplifier 5 provides control of the read out operation. When it is desired to inhibit read out of information from the memory device, a signal is applied to the control input 5E which is of the overriding type. That is, the signal applied to the control input 5E deflects the power stream to the fluid return duct 5C irregardless of the presence or absence of signals at the control input 5B. Thus the data signals appearing at input 5B cannot be transmitted to the output duct 5D. When it is desired to read out the information in the delay line, the control signal 5E is removed during the time intervals T1 through T4 of the readout cycle. In the example, given signals representing binary ones will appear at control input 5B during time T1, T3 and T4 of the read-out cycle. These signals will deflect the power stream of amplifier 5 to the output duct 5D during these time intervals to produce output signals representing binary ones. Since a relatively low pressure signal representing binary zero, is applied to the control input 5B during the time interval T2, the power stream returns to the no-signal condition. That is, the power stream switches from the output 5D to the return duct 5C thus creating a relatively low pressure output signal to represent the binary zero.

Signals representing data may be cleared from the delay line by applying pulses to the control input 1F of amplifier 1 during the time intervals T0 through T3. As explained before, this signal will override control signals (if any) appearing at the input 1B and the power stream will be directed to the fluid return duct 1C for at least as long as a signal is applied to the control input 1F.

Figure 2:
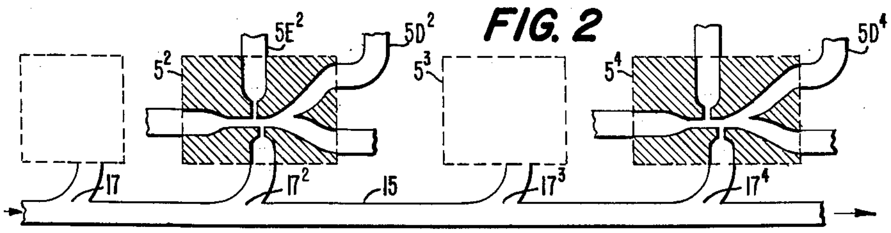
FIGURE 2 is a modification of FIGURE 1 adapted to produce parallel output signals in response to serial input signals; and, FIGURE 3 is a timing diagram illustrating the operation of the embodiments shown in FIGURES 1 and 2.

FIGURE 2 illustrates the manner in which the present invention may be adapted to read out the four binary bits of information simultaneously with each bit appearing on a separate output duct. The delay line is provided with three additional taps $17^2$, $17^3$ and $17^4$. Each tap is connected to the control input duct of an amplifier 5 similar to that shown in FIG. 1. The taps are spaced along the delay line at given intervals D where D is the distance through which a signal in the delay line will travel during one bit time.

From the timing diagram of FIG. 3 and the above explanation of the operation of FIG. 1, it is obvious that at time T4 the last or fourth binary bit of information is present at the tap 17 of FIG. 1. Also, at the time T4 the third information pulse applied to the system is at a point one-fourth of the way between tap 17 and the input to amplifier 1; the second information signal applied to the system is in the delay line at a point one-half of the distance between tap 17 and the input to amplifier 1; and the first pulse applied to the system is at a point three-fourths of the distance between the tap 17 and the input to amplifier 1. By providing taps at these points and amplifying the signals occurring at time T4, all information signals stored in the delay line may be reproduced simultaneously on parallel output ducts. This arrangement requires only one bit interval T4 in order to read out all of the information whereas the embodiment of FIG. 1 requires four bit intervals (T1 through T4). Therefore, the inhibit readout signal is applied to amplifiers 5, $5^2$, $5^3$ and $5^4$ at all times except T4 of a readout cycle.

The timing diagram illustrates this point and also shows that amplifiers 5, $5^2$ and $5^4$ will produce binary one output signals simultaneously during time T4 if the binary value stored is 13.

While the embodiment of FIG. 1 has for the sake of clarity been described as capable of storing one word containing four binary bits of information, it is obvious that by increasing the length of the delay line 15 it may be utilized to store words containing more than four bits of information. In like manner, by increasing the length of the delay line 15 and properly controlling the write and read control signals a plurality of words may be stored in the delay line simultaneously with the words being written or read out without disturbing the remaining words. In some applications it may not be necessary to provide a binary bit period T0 for external switching operations. In this situation the taps 17 are moved closer to the amplifier 1 so that there will be negligible delay between the application of a signal to the input 1E and the time the pulse appears at the tap 17.

The embodiment of FIGURE 2 illustrates the manner in which a parallel readout device may be constructed. It will be obvious to those skilled in the art that a device capable of writing information received on parallel ducts may be obtained by providing a plurality of amplifiers 1, the output of each amplifier being connected through a section of a delay line to the B input of the next amplifier.

While the novel features of the invention as applied to preferred embodiments have been shown and described, it will be understood that various omissions and substitutions in the form and detail of the devices illustrated may be made by those skilled in the art without departing from the spirit of the invention.

I claim:

1. A data storage device comprising: a fluid amplifier responsive to fluid input signals for producing fluid output signals; means for applying fluid signals to said amplifier; and means for simultaneously storing a plurality of signals applied to said amplifier, said storing means comprising a fluid transmission line responsive to said output signals from said amplifier for applying fluid input signals to said amplifier.

2. A data storage device comprising: a fluid delay line, a first fluid amplifier having both an output and an input connected to said delay line, and means for reading signals circulating in said delay line, said reading means comprising a second fluid amplifier.

3. A data storage device comprising: a fluid amplifier having first and second control signal inputs and a data signal output; signal delay means connected between said data signal output and said first control signal input; means to apply input data signals to said second control signal input; and means connected to said signal delay means for reading out data signals.

4. A data storage device as claimed in claim 3 wherein said signal delay means comprises a fluid conducting means and said readout means comprises a further fluid amplifier connected to said fluid conducting means at a point intermediate its ends.

5. A data storage device as claimed in claim 3 wherein said signal delay means comprises a fluid conducting means and said readout means comprises a plurality of fluid amplifiers connected to said fluid conducting means at equidistant intervals along its length.

6. A data storage device comprising: a fluid amplifier having first, second and third control signal inputs and a data signal output; signal delay means connected between said data signal output and said first control signal input; means for applying signal pulses to said second and said third control signal inputs; and readout means responsive to signals from said signal delay means for producing data output signals.

7. A data storage device as claimed in claim 6 wherein said fluid amplifier also includes a power stream input and a fluid return duct and means connected to said power stream input for providing a fluid power stream which normally flows from said power stream input to said fluid return duct.

8. A data storage device as claimed in claim 7 wherein said first control signal input is responsive to signals from said delay means for directing said power stream to said data signal output of said amplifier.

9. A data storage device as claimed in claim 8 wherein said second control signal input is responsive to said signal pulses for directing said power stream to said data signal output of said amplifier.

10. A data storage device as claimed in claim 9 wherein said third control signal input is responsive to said signal pulses for directing said power stream to said fluid return duct of said amplifier.

11. A data storage device as claimed in claim 10 wherein said third control signal input is of the overriding type causing direction of said power stream to said return duct despite the tendency of signals at said first and second control inputs to direct it to said data signal output.

12. A recirculating data storage device comprising: fluid amplifier means and fluid delay line means connected in a data pulse recirculating loop; means for applying signals to said fluid amplifier means; and means connected to said data pulse recirculating loop for reading out said data pulses.

13. A recirculating data storage device as claimed in claim 12 wherein said fluid amplifier means comprises as a plurality of series connected fluid amplifiers, the output of each amplifier being connected to an input of the next succeeding amplifier through a segment of said fluid delay line means; and further means for applying input signals to each of said amplifiers simultaneously.

14. A data storage device for storing a plurality of bits of binary information as a series of signals propagated through a fluid conducting element, said storage device comprising: a fluid amplifier having first, second, and third fluid control signal inputs and a data signal output; a fluid conducting element having one end thereof connected to said data signal output of said fluid amplifier and a second end connected to said first control signal input of said fluid amplifier; means including said second control signal input for selectively applying data signals to said fluid amplifier; means connected to said fluid conducting element for reproducing the signals circulating therein; and means including said third control signal input for erasing at least some of the signals applied to said first control signal input.

15. A data storage device comprising: means for generating a plurality of fluid signals representing data; fluid delay line means responsive to said generating means for storing said data as a sequence of fluid signals equally spaced in time and propagating through said fluid delay line means; and pure fluid amplifier means for reading out said data, said pure fluid amplifier means comprising a power stream input duct, a control signal duct, an inhibit signal duct, and first and second output ducts; means for applying a power stream to said power stream input duct, said control signal duct being connected to said fluid delay line means and responsive to said fluid signals propagating therein for selectively deflecting said power stream to said first output duct; and means for selectively applying fluid signals to said inhibit signal duct to inhibit read-out of said data by deflecting said power stream to said second output duct.

16. A data storage device comprising: means for generating a plurality of fluid signals representing data; fluid delay line means responsive to said generating means for storing said data as a sequence of fluid signals equally spaced in time and propagating through said fluid delay line means; and means for reading out said data, said read-out means comprising at least three pure fluid amplifier means connected to said fluid delay line means at equally spaced intervals and responsive to said fluid signals propagating therein for simultaneously producing fluid output signals representing said stored data.

References Cited in the file of this patent

UNITED STATES PATENTS

| | | |
|---|---|---|
| 2,106,036 | O'Connor | Jan. 18, 1938 |
| 2,550,723 | Ross | May 1, 1951 |
| 2,662,540 | Rutherford et al. | Dec. 15, 1953 |
| 2,745,423 | Grogan | May 15, 1956 |
| 2,827,566 | Lubkin | Mar. 18, 1956 |